United States Patent Office 3,198,644
Patented Aug. 3, 1965

3,198,644
MORTAR COMPOSITIONS
Anthony J. Simonson, Yardley, Pa., assignor to Thiokol Chemical Corporation, Bristol, Pa.
No Drawing. Filed Nov. 15, 1961, Ser. No. 152,681
19 Claims. (Cl. 106—93)

The present invention relates to an improved mortar composition.

The object of the present invention is to provide an improved mortar composition for use, in particular, for stucco and for the installation of concrete blocks and bricks.

U.S. 2,820,713 discloses mortar compositions which contain methyl cellulose as well as alkaline earth metal polysulfides and/or Bunte salts for the purpose of improving the water retention properties of the mortar. These compositions, however, which contain 0.25 to 2.25% methyl cellulose (based on weight of Portland cement) and 4:1 parts by volume of sand to Portland cement are unsuitable for use in stucco applications and for the installation of concrete blocks and bricks. These compositions are too sticky to be of practical utility in that the stickiness of the mortars substantially interferes with the work output of the mason. The mortar sticks to the mixing equipment and trowel and prevents a facile preparation and transfer of mortar to the intended area of use. Because of the looseness of these compositions, moreover, they will not readily support the weight of the blocks or bricks set therein with the result that it is not practically possible to construct a wall or structure with these compositions that will have evenly spaced layers or tiers of blocks or bricks. These compositions are unsuitable for stucco applications in that, because of their stickiness and workability it is not possible to apply a uniform coat of the stucco to the work area. It is necessary, moreover, to use two or three coats of the conventional stucco compositions in order to obtain a stucco coating which is of more than ¼ inch in depth. These coats of conventional stucco material, moreover, have poor adhesion properties. The use of Bunte salts and inorganic polysulfide materials in compositions containing cement is also disclosed in U.S. 2,962,467.

It has now been unexpectedly found according to the present invention that mortar compositions, containing cellulose materials as well as approximately 0.1 to 10% alkaline earth metal polysulfides and/or alkali metal polysulfides and Bunte salts, and/or the latex reaction products thereof, can be used for stucco applications as well as for the installation of blocks and bricks if about 0.05 to 0.25 part by weight of cellulose material, about 65 to 75 parts by weight of water and 500 to 700 parts by weight of sand are used per hundred parts by weight of Portland cement in preparing the mortar compositions. The preferred mortar compositions of the present invention contain about 2 parts by weight of the polysulfide/Bunte salt mixture, and/or the latex reaction products thereof, about 0.25 part by weight of the cellulose material, about 65 parts by weight of water and about 500 parts by weight of sand based on 100 parts by weight of Portland cement. The dry ingredients of the novel mortar compositions of the present invention can be mixed together and stored to form a dry mix. When mixed with the prescribed quantities of water they will form a mortar mix which can be used in the applications described herein.

The water retention properties of the novel mortar compositions of the present invention, moreover, are as good as those of the compositions disclosed in U.S. 2,820,713. With these novel mortar compositions an experienced mason can apply a stucco coating of up to 2 inches in depth in an even coat with one application and without the need for scratch coating the base structure or when used for the installation of concrete blocks and bricks he can readily butter a work area of up to 100 feet long with these compositions and still have adequate time in which to set the blocks or bricks before the mortar sets. The tensile bond strength of the cured novel mortar compositions is still up to five to ten times superior to compositions not containing cellulose and polysulfide and/or Bunte salt materials and is superior to the compositions disclosed in 2,820,713. The percent flow of these novel mortar compositions is of the order of 80–90 in comparison to the percent flow of conventional mortar mixes and the mixes of 2,820,713 which are of the order of 120–150. The unexpected low flow rate and thixotropic properties of these novel mortar compositions is probably the reason for their unexpected utility in stucco applications in particular.

The cellulose materials which can be used in the mortar compositions of the present invention includes methyl cellulose having a viscosity of 4,000 to 20,000 centipoises when measured in a 2% aqueous solution and 2-hydroxy ethyl cellulose having a viscosity of 5,000 to 20,000 when measured in a 2% aqueous solution. The preferred cellulose materials are methyl cellulose of 15,000 centipoise viscosity and 2-hydroxy ethyl cellulose of 20,000 centipoise viscosity. Depending on the application, smaller amounts of the cellulose materials having the higher viscosity values can be used in place of larger amounts of the cellulose materials having the lower viscosity values.

The Bunte salts and polysulfide materials and amounts thereof used in the novel compositions of the present invention may be the same as those discussed in U.S. 2,820,713 and 2,962,467. Useful Bunte salts are water soluble organic thiosulfate compounds which are readily prepared by reacting organic dihalides and polyhalides with water soluble inorganic thiosulfates. This may be accomplished by refluxing at 95 to 120° C. the organic halide, such as an oxalkylene dichloride or an alkylene dichloride with an aqueous solution of an inorganic thiosulfate. Typical of such reactions would be those between sodium thiosulfate and bis-beta chloroethyl ether or between sodium thiosulfate and ethylene dichloride. The Bunte salts prepared by these typical reactions are the preferred Bunte salts for use in the mortar compositions of the present invention. The Bunte salts and the polysulfide materials are preferably used in the form of a preformed and spray dried polymeric latex reaction product of the Bunte salt and the polysulfide material. The spray dried reaction products are preferably formed in the presence of a dispersing agent such as magnesium hydroxide or polymerized alkyl naphthalene sulfonic acid. The preparation of the spray dried material is conducted in such a way that the Bunte salt, polysulfide and dispersing agent are mixed together in a chamber just behind the nozzle of the spray drier device just prior to the spray drying of the resulting polymeric product. The spray dried material is preferably prepared under approximately neutral conditions. The spray dried material is preferable because it does not give off an objectionable odor when used in the novel mortar compositions of the present invention as is the case when the Bunte salt and polysulfide material are used as described in U.S. 2,820,713.

The amount of Bunte salt and polysulfide used in the mortar compositions should be about 0.1 to 10% with respect to the weight of Portland cement. With respect to the proportion of the two ingredients that make up the combination, as is, or as a spray dried reaction product, the ratio of the Bunte salt to polysulfide should not be higher than about 3 to 1 and is preferably about 2:1. The preferred polysulfides are the calcium, barium, sodium, potassium and strontium polysulfides.

The mortar compositions of the present invention do not require the use of hardening accelerators or antishrinking agents. Whiteners and pigments such as titanium dioxide may be used with the novel mortar compositions of the present invention. When used for stucco applications beach sand or marble dust may be used as the sand component of the compositions in order to make them whiter.

The following examples are merely illustrative of the present invention and are not intended as a limitation upon the scope thereof.

| Examples | Parts by Weight | | | | | |
|---|---|---|---|---|---|---|
| | 1 | 2 | 3 | 4 | 5 | 6 |
| Portland Cement | 100 | 100 | 100 | 100 | 100 | 100 |
| Sand | 500 | 500 | 500 | 700 | 700 | 700 |
| Water | 65 | 68 | 69 | 70 | 71 | 75 |
| Methyl Cellulose, 4,000 cps | 0.25 | 0.20 | | | | |
| Methyl Cellulose 15,000 cps | | | 0.05 | 0.05 | | |
| 2-Hydroxy Ethyl Cellulose, 20,000 cps | | | | | 0.10 | 0.10 |
| Bis-Beta Chloroethyl Ether Bunte Salt | 1.7 | 2.0 | | | | |
| Ethylene Dichloride Bunte Salt | | | 3.0 | 4.0 | | |
| Calcium Polysulfide | 0.6 | | | | | |
| Barium Polysulfide | | 1.0 | 1.5 | | | |
| Strontium Polysulfide | | | | 2.0 | | |
| Spray Dried Latex I [1] | | | | | 8.0 | |
| Spray Dried Latex II [2] | | | | | | 10.0 |

[1] Latex formed as in Example 7 below. In that example the sodium salt of polymerized alkyl napthalene sulfonic acid is a dispersing agent used to form discrete particles of the spray dried material. The soda ash is used to regulate the pH. The resulting latex contains the Bunte salt and calcium polysulfide, in polymer form, in about 3:2 ratio.
[2] Latex formed as in Example 8 below.

When used as mortar compositions these mixtures have good water retention, flow rates and tensile bond strength properties. In stucco applications they can be used without the need for subjecting the work area to a prewetting treatment or to the application of a scratch coat thereto, to apply, in one application, a uniform coating up to 2 inches thick of mortar to the work area. These coatings have excellent adhesion, crack resistant and weather resistant properties. For the installation of cement block or brick walls these mortar compositions have, in addition to good water retention, flow and tensile bond strength properties, excellent thixotropic properties which enable them to support the concrete blocks and bricks in such a manner as to enable the mason to form uniform, evenly spread tiers or layers of the blocks and bricks. The experienced mason can butter up to about 100 feet of work area with these mortar compositions before having to set the blocks or bricks in the mortar before it sets. These compositions are not sticky and offer no resistance to manipulation during the mixing and use thereof.

*Example 7*

Initially, an aqueous solution of the Bunte salt from dichlorodiethylether was prepared by reacting 71.5 pounds of dichloroethylether, $ClH_2C_2$—O—$C_2H_2Cl$, with 310 pounds of sodium thiosulfate, $Na_2S_2O_3$, in a solution containing 30 pounds of the sodium salt of polymerized alkyl naphthalene sulfonic acid (Darvan #1, marketed by R. T. Vanderbilt Co.) and 2.12 pounds of soda ash, $Na_2CO_3$, in 393 pounds of water. This solution contained the equivalent of $7.5 \times 10^{-4}$ moles or 0.2565 gram of Bunte salt per ml.

12,550 ml. of an aqueous solution of this Bunte salt solution containing the equivalent of 3220 g. of the Bunte salt were charged into a 10 gallon stainless steel reactor which was fitted with an agitator. To this was fed 5,450 ml. of an aqueous lime sulfur solution containing 2,100 g. of lime sulfur ($CaS_{4 \text{ to } 5}$) in the following manner: 600 ml. per minute for the first six minutes, and 300 ml./min. thereafter. Agitation was maintained throughout this time interval. Were agitation stopped, coagulation would occur. The fine latex suspension that resulted had a pH of about 6.9. Agitation was maintained until the suspension was spray dried. For this spray drying operation, the laboratory model spray drier produced by Bowen Engineering, Inc. (North Branch, N.J.), was used. The atomizer nozzle used was Bowen's SS #5. A full description of this apparatus is contained in Bowen's publication "Bulletin 34."

In spray drying, the latex suspension was fed into a glass separatory feed funnel from which it flowed by gravity to the atomizer nozzle. There, hot compressed air flowing at the rate of about 12 lb./hr. atomized the suspension and dried the latex particles, which were then further carried by this air stream into a cyclone separator where they were collected.

The following table presents a summary of the operation of the spray drier operating conditions and the results obtained.

Feed conditions:
    Feed temperature _____ Room temperature (75° F.).
    Feed rate ml./min. _____ 280–350.
    Amount fed, ml. _____ 2840.
Operating conditions:
    Inlet temperature, ° F. _____ 500.
    Outlet temperature, ° F. _____ 290–278.

*Example 8*

An ethylene chloride Bunte salt was formed in solution by reacting 49.5 lbs. of ethylene dichloride with 310 pounds of sodium thiosulfate in the presence of 27 lbs. of a dispersing agent, polymerized alkyl naphthalene sulfonic acid and 2.12 lbs. of soda ash (which was used to control pH) in 383 lbs. of water. The pH of the solution was about 7 and it contained the equivalent of $6.9 \times 10^{-4}$ mols/ml. or 0.206 g./ml. of the Bunte salt.

9,220 ml. of the Bunte salt solution prepared as above were charged to a 10 gallon stainless steel reactor fitted with an agitator. The Bunte salt solution was reacted and processed as in Example 7 with 2780 ml. of an aqueous solution of calcium polysulfide containing approximately 1035 g. of $CaS_{4 \text{ to } 5}$.

Spray drying conditions:
   Feed conditions—
      Feed temperature, ° F. _____ Room temperature.
      Feed rate, ml./min. _____ 195–270.
      Amount fed, ml. _____ 11,900.
   Operating conditions—
      Inlet temperature, ° F. _____ 450.
      Outlet temperature, ° F. ____ 264–240.

The resulting spray dried material contained, in polymeric form, the Bunte salt and the calcium polysulfide in about a 1.9 to 1.0 ratio.

I claim:
1. A composition capable of being mixed with about 65 to about 75 parts by weight of water to form a masonry and stucco mortar and consisting essentially of, in combination with each 100 parts by weight of Portland cement therein, about 500 to 700 parts by weight of sand, about 0.05 to 0.25 part by weight of a cellulose material selected from the group consisting of methyl cellulose having a viscosity of about 4,000 to 20,000 centipoises in a 2% aqueous solution and 2-hydroxy ethyl cellulose having a viscosity of about 5,000 to 20,000 centipoises in a 2% aqueous solution and about 0.1 to 10 parts by weight of a Bunte salt and a polysulfide selected from the group consisting of alkaline earth metal and alkali metal polysulfides, said Bunte salt and said polysulfide being present in said composition in a weight ratio of about 2:1 to 3:1.

2. A composition as in claim 1 in which said cellulose material is methyl cellulose having a viscosity of about 15,000 centiposes in a 2% aqueous solution.

3. A composition as in claim 1 in which said cellulose material is 2-hydroxy ethyl cellulose having a viscosity of about 20,000 centipoises in a 2% aqueous solution.

4. A composition as in claim 1 in which said Bunte salt and said polysulfide are present in a weight ratio of about 2:1.

5. A composition as in claim 1 in which said Bunte salt is the reaction product of a water soluble thiosulfate and ethylene dichloride.

6. A composition as in claim 1 in which said Bunte salt is the reaction product of a water soluble thiosulfate and bis-beta chloroethyl ether.

7. A composition as in claim 1 in which said Bunte salt and said polysulfide are reacted together and present in said composition in the form of a spray dried polymeric latex.

8. A composition as in claim 1 in which said polysulfide is an alkaline earth metal polysulfide.

9. A composition as in claim 8 in which said polysulfide is calcium polysulfide.

10. A composition as in claim 8 in which said polysulfide is barium polysulfide.

11. A composition as in claim 8 in which said polysulfide is strontium polysulfide.

12. A composition capable of being mixed with about 65 to about 75 parts by weight of water to form a masonry and stucco mortar and consisting essentially of, in combination with each 100 parts by weight of Portland cement therein, about 500 parts by weight of sand, about 0.25 part by weight of methyl cellulose having a viscosity of about 15,000 centipoises in a 2% aqueous solution and about 2 parts by weight of a Bunte salt and an alkaline earth metal polysulfide, said Bunte salt and said polysulfide being present in said composition in a weight ratio of about 2:1.

13. A masonry and stucco mortar composition consisting essentially of, in combination with each 100 parts by weight of Portland cement therein, about 65 to 75 parts by weight of water, about 500 to 700 parts by weight of sand, about 0.05 to 0.25 part by weight of a cellulose material selected from the group consisting of methyl cellulose having a viscosity of about 4,000 to 20,000 centipoises in a 2% aqueous solution and 2-hydroxy-ethyl-cellulose having a viscosity of about 5,000 to 20,000 centipoises in a 2% aqueous solution and about 0.1 to 10 parts by weight of an organic polysulfide composition selected from the group of such compositions consisting of (i) the mixture of a Bunte salt and a polysulfide selected from the group consisting of alkaline earth metal and alkali metal polysulfides, said Bunte salt and said polysulfide being present in said composition in a weight ratio of about 2:1 to 3:1 and (ii) the spray dried polymeric latex reaction products of said mixture and water.

14. A mortar composition according to claim 13 wherein said organic polysulfide composition is the spray dried reaction products of a Bunte salt, an alkaline earth metal polysulfide and water.

15. A mortar composition consisting essentially of, in combination with each 100 parts by weight of Portland cement therein, about 65 parts by weight of water, about 500 parts by weight of sand, about 0.25 part by weight of methyl cellulose having a viscosity of about 15,000 centipoises in a 2% aqueous solution and about 2 parts by weight of a Bunte salt and an alkaline earth metal polysulfide, said Bunte salt and said polysulfide being present in said mortar in a weight ratio of about 2:1.

16. A process for applying stucco to a base structure which essentially consists of applying to said base structure a mortar composition comprising per 100 parts by weight of Portland cement therein, about 65 to 75 parts by weight of water, about 500 to 700 parts by weight of sand, about 0.05 to 0.25 part by weight of a cellulose material selected from the group consisting of methyl cellulose having a viscosity of about 4,000 to 20,000 centipoises in a 2% aqueous solution and 2-hydroxy ethyl cellulose having a viscosity of about 5,000 to 20,000 centipoises in a 2% aqueous solution and about 0.1 to 10 parts by weight of an organic polysulfide composition selected from the group of such compositions consisting of (i) the mixture of a Bunte salt and a polysulfide selected from the group consisting of alkaline earth metal and alkali metal polysulfides, said Bunte salt and said polysulfide being present in said composition in a weight ratio of about 2:1 to 3:1 and (ii) the spray dried polymeric latex reaction products of said mixture and water.

17. A process as in claim 16 in which said mortar composition is applied to said base structure in a single coat of about two inches in depth.

18. A process for applying stucco to a base structure which essentially consists of applying to said base structure a mortar composition comprising, per 100 parts by weight of Portland cement therein, about 65 parts by weight of water, about 500 parts by weight of sand, about 0.25 part by weight of methyl cellulose having a viscosity of about 15,000 in a 2% aqueous solution and about 2 parts by weight of a Bunte salt and an alkaline earth metal polysulfide, said Bunte salt and said polysulfide being present in said composition in a weight ratio of about 2:1.

19. A process as in claim 18 in which said mortar composition is applied to said base structure in a single coat of about two inches in depth.

References Cited by the Examiner
UNITED STATES PATENTS

| | | | |
|---|---|---|---|
| 2,570,827 | 10/51 | Madison et al. | 106—93 |
| 2,820,713 | 1/58 | Wagner | 106—93 |
| 2,838,411 | 6/58 | Wagner | 106—93 |
| 2,934,932 | 5/60 | Wagner | 106—93 |
| 2,959,489 | 11/69 | Wagner | 106—93 |

JOSEPH REBOLD, Examiner.

TOBIAS E. LEVOW, Primary Examiner.